Figure 1:
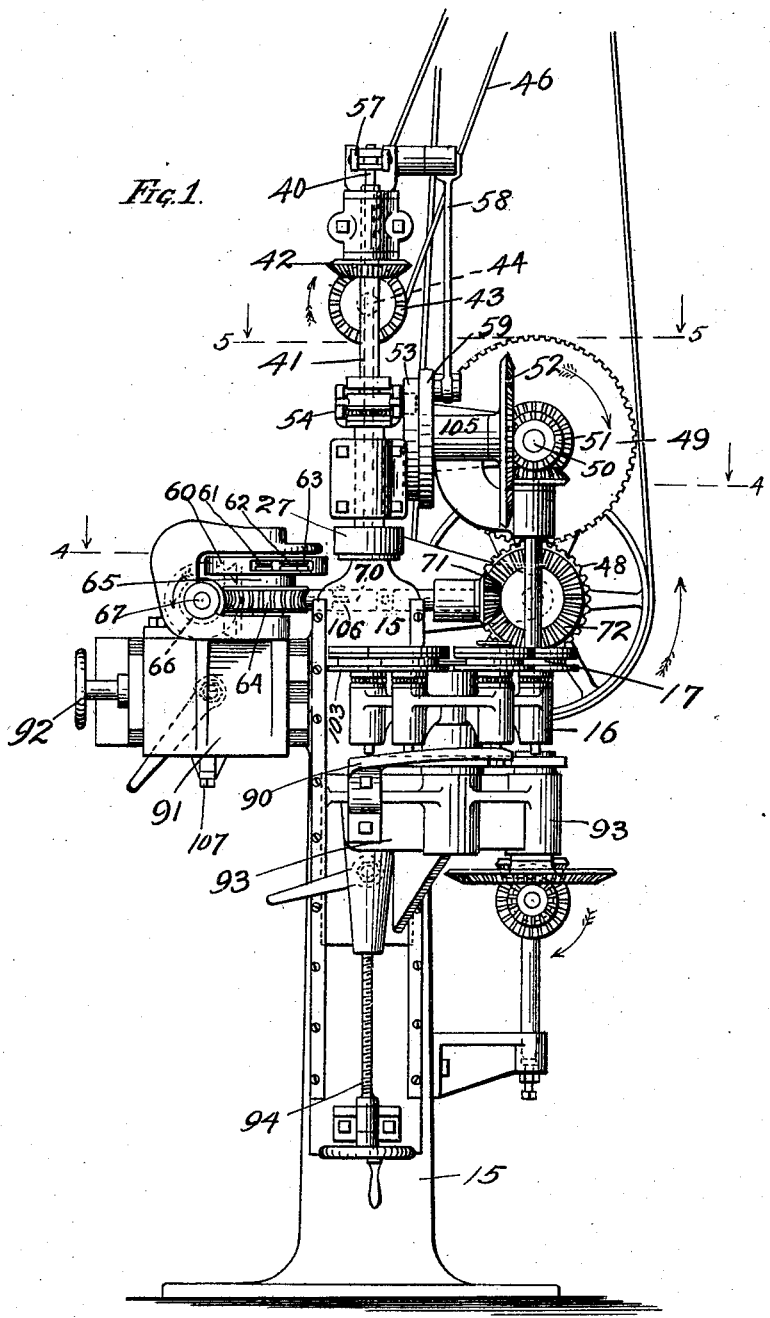

No. 693,303. Patented Feb. 11, 1902.
E. NORTON & J. G. HODGSON.
AUTOMATIC DOUBLE SEAMING MACHINE.
(Application filed July 8, 1901.)

(No Model.) 7 Sheets—Sheet 1.

WITNESSES: INVENTORS,
Edwin Norton
John G. Hodgson
BY
Munday, Evarts & Adcock
ATTORNEYS No. 693,303. Patented Feb. 11, 1902.
E. NORTON & J. G. HODGSON.
AUTOMATIC DOUBLE SEAMING MACHINE.
(Application filed July 8, 1901.)
(No Model.) 7 Sheets—Sheet 2.

No. 693,303. Patented Feb. 11, 1902.
E. NORTON & J. G. HODGSON.
AUTOMATIC DOUBLE SEAMING MACHINE.
(Application filed July 8, 1901.)

(No Model.) 7 Sheets—Sheet 4.

WITNESSES: INVENTORS:

No. 693,303. Patented Feb. 11, 1902.
E. NORTON & J. G. HODGSON.
AUTOMATIC DOUBLE SEAMING MACHINE.
(Application filed July 8, 1901.)
(No Model.) 7 Sheets—Sheet 5.
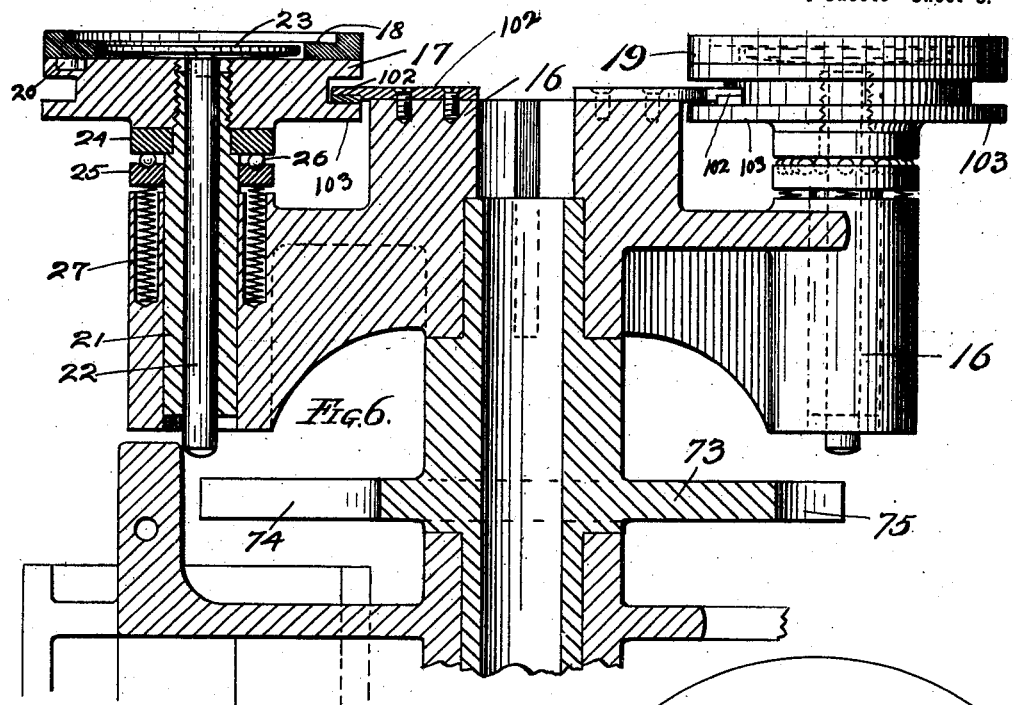
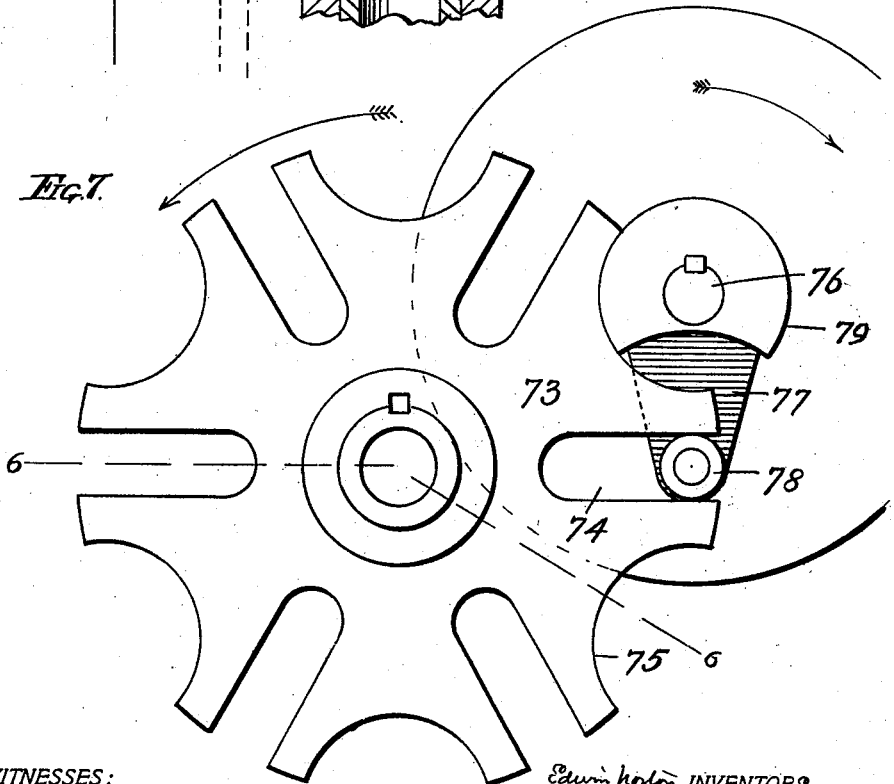
WITNESSES:
F. B. Townsend
H. W. Munday
INVENTORS
Edwin Norton
John G. Hodgson
BY
Munday, Evarts & Adcock
ATTORNEYS No. 693,303. Patented Feb. 11, 1902.
E. NORTON & J. G. HODGSON.
AUTOMATIC DOUBLE SEAMING MACHINE.
(Application filed July 8, 1901.)
(No Model.) 7 Sheets—Sheet 6.
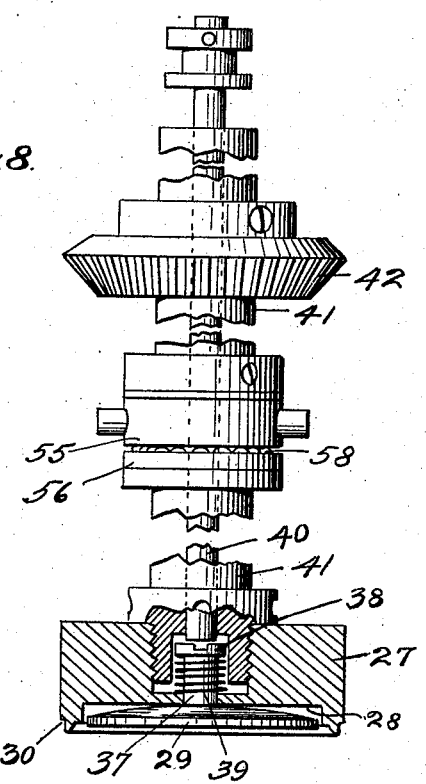
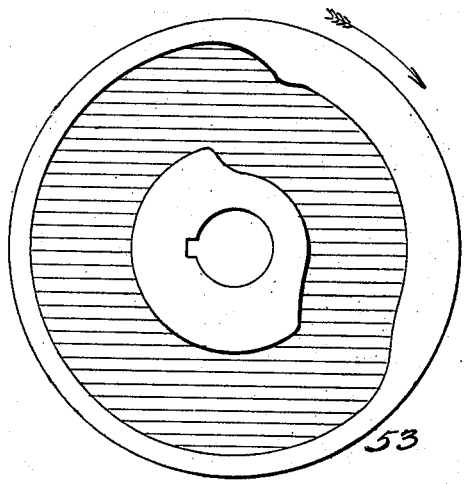
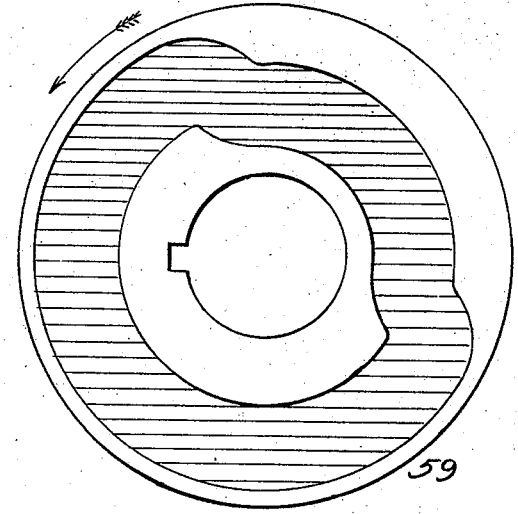

No. 693,303. Patented Feb. 11, 1902.
E. NORTON & J. G. HODGSON.
AUTOMATIC DOUBLE SEAMING MACHINE.
(Application filed July 8, 1901.)

(No Model.) 7 Sheets—Sheet 7.

UNITED STATES PATENT OFFICE.

EDWIN NORTON, OF NEW YORK, N. Y., AND JOHN G. HODGSON, OF MAYWOOD, ILLINOIS, ASSIGNORS TO AUTOMATIC VACUUM CANNING COMPANY, OF CHICAGO, ILLINOIS, A CORPORATION OF ILLINOIS.

AUTOMATIC DOUBLE-SEAMING MACHINE.

SPECIFICATION forming part of Letters Patent No. 693,303, dated February 11, 1902.

Application filed July 8, 1901. Serial No. 67,460. (No model.)

*To all whom it may concern:*

Be it known that we, EDWIN NORTON, residing in the city of New York, in the county of New York and State of New York, and JOHN G. HODGSON, residing in the village of Maywood, in the county of Cook and State of Illinois, citizens of the United States, have invented a new and useful Improvement in Automatic Double-Seaming Machines, of which the following is a specification.

Our invention relates to machines for double-seaming covers on sheet-metal cans.

The object of our invention is to provide a machine of a simple, efficient, and durable construction by means of which this work may be done with certainty and uniformity and so as to form hermetically-tight and perfect double seams and which will be automatic and rapid and cheap in operation.

Our invention consists in the combination, with an intermittently-rotating turret or table provided with a series of rotating can-holder chucks or disks and with ejectors for the cans, of a rotating and reciprocating can-holder chuck into registry with which the series of can-holder chucks or disks on the rotating turret or table are brought in turn by the intermittent movement of said turret or table, and a continuously-rotating tool-carrier provided with a series of sets of double-seaming tools or rollers, the several tools of each set being brought successively into operation upon each can by the rotating tool-carrier during the period of pause of the can-holder turret or table, and a succeeding set of tools being brought into position for operation upon the next can by the further movement of the tool-carrier while the can-holder turret or table is making its next forward step or movement.

Our invention also consists in the novel devices and in the novel combinations of parts and devices herein shown and described, and specified in the claims.

Figure 2:
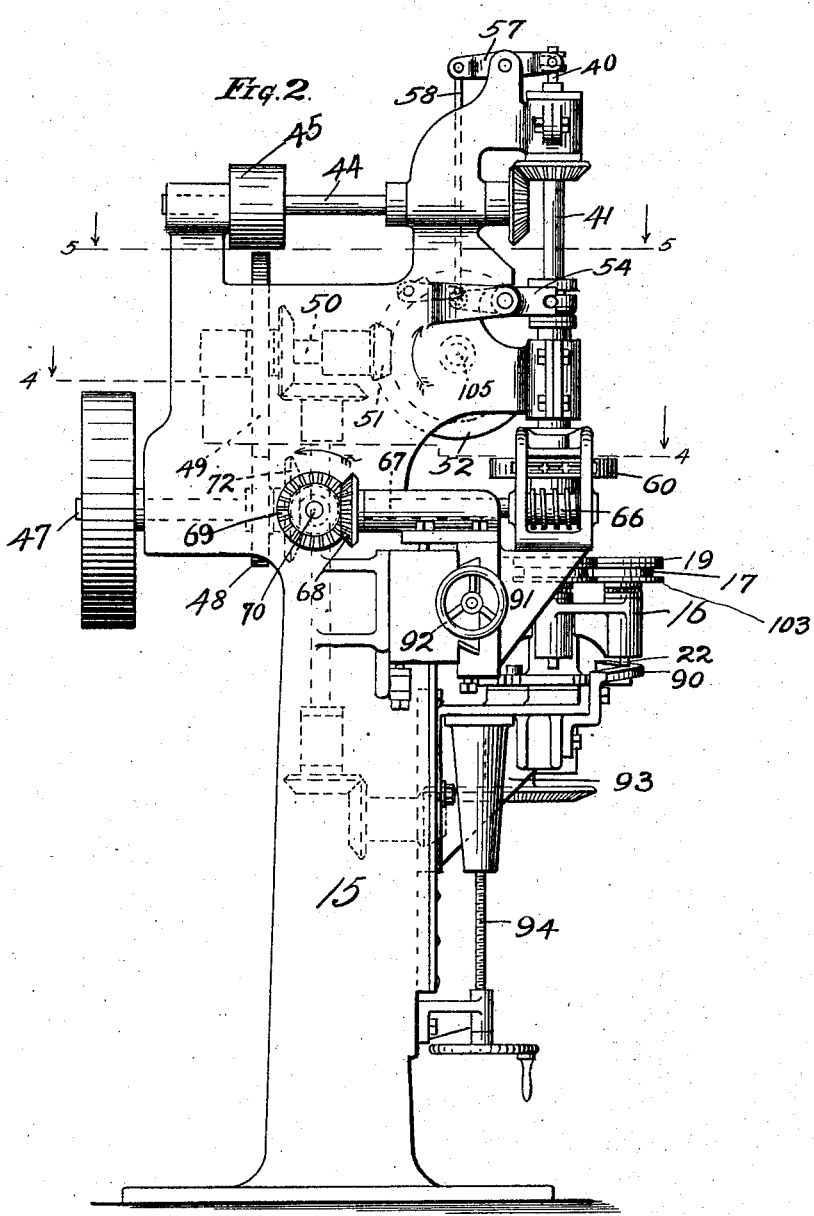
Figure 3:
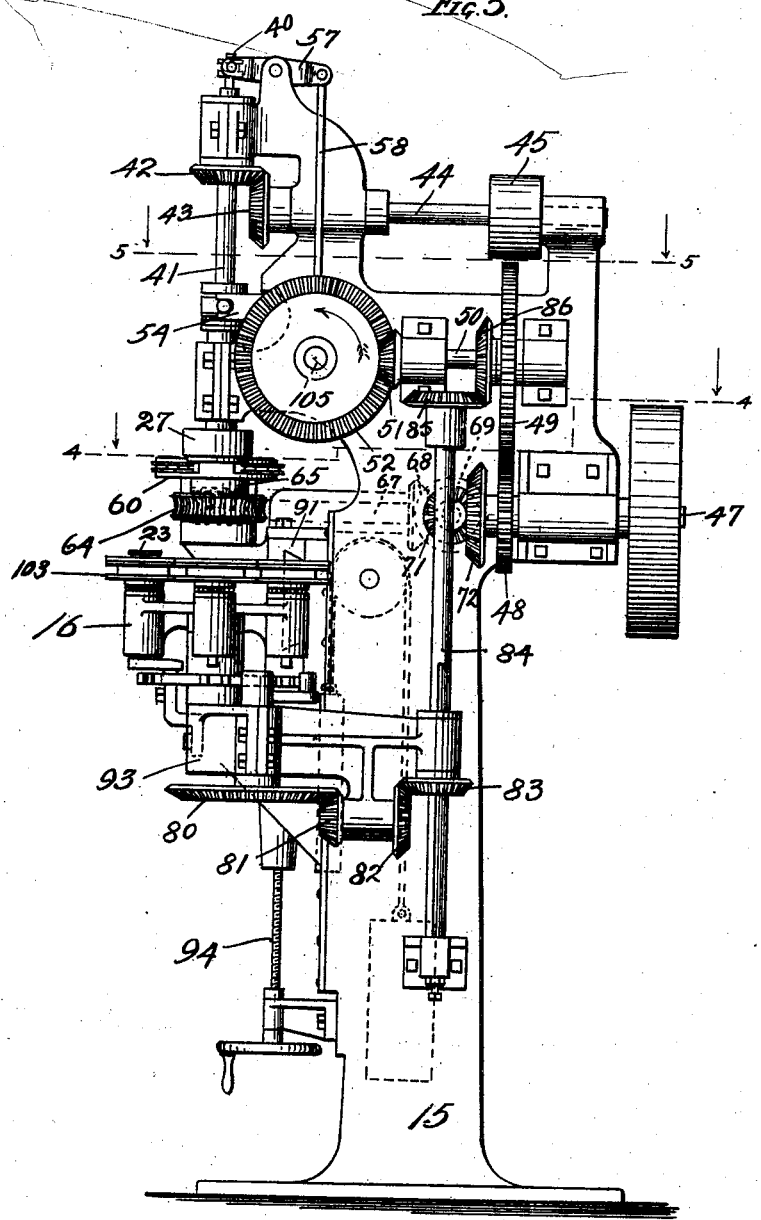
Figure 4:
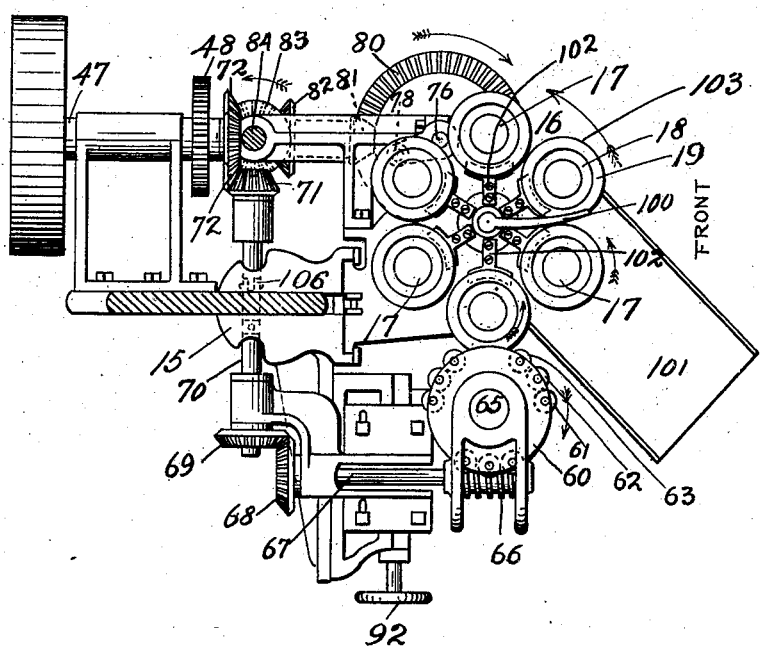
Figure 5:
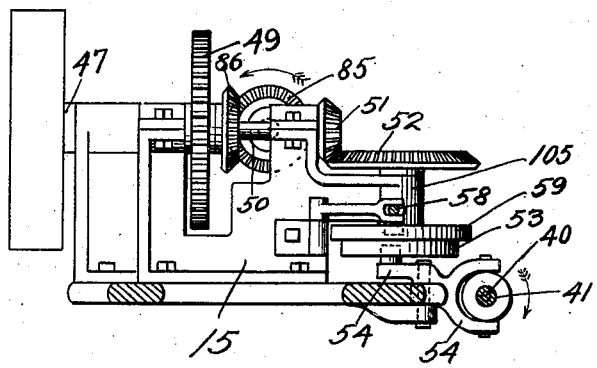
Figure 11:
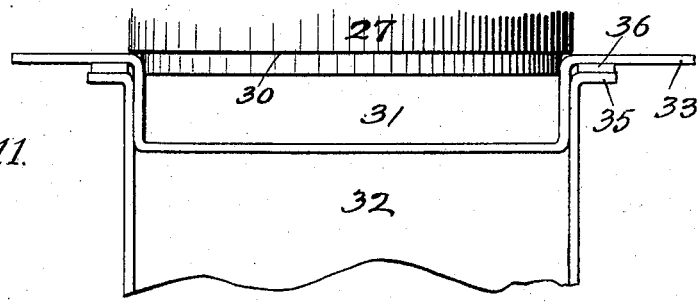
Figure 12:
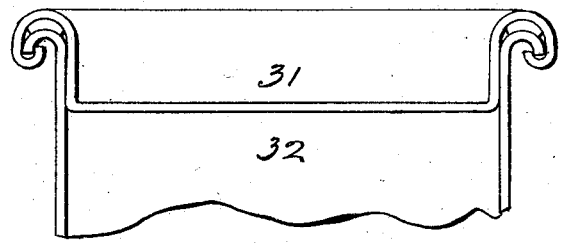
Figure 13:
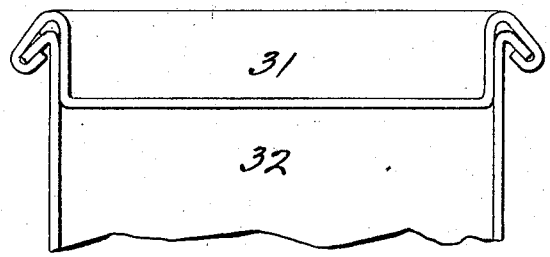
Figure 14:
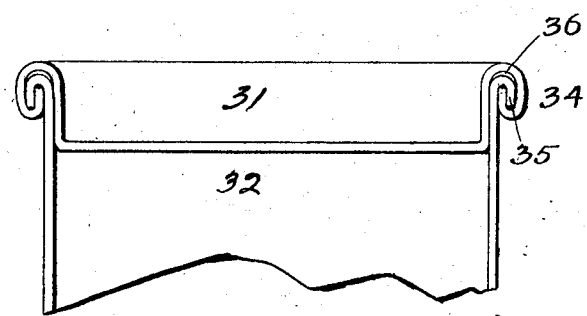

In the accompanying drawings, forming a part of this specification, Figure 1 is a front view of a machine embodying our invention. Figs. 2 and 3 are side elevations looking from opposite sides of the machine. Figs. 4 and 5 are horizontal sections on the lines 4 4 and 5 5, respectively, of Figs. 1, 2, and 3. Fig. 6 is a vertical section through the turret on the line 6 6 of Fig. 7. Fig. 7 is an enlarged detail plan view of the spider and mechanism for rotating and locking the turret. Fig. 8 is a detail elevation, partly in section, of the upper can-holder chuck. Figs. 9 and 10 are detail views of the cams for operating the upper chuck and its ejector. Figs. 11, 12, 13, and 14 are enlarged diagrammatic views representing the operation on the can.

In said drawings, 15 represents the frame of the machine.

16 is an intermittently-rotating can-holder turret or table, the same being provided with a series (preferably six) of rotatable can-holder chucks or disks 17, each having a countersunk seat 18 for the can, the same being formed of a rubber or elastic cushion 19, secured to the disk 17 by lugs 20 entering suitable recesses in the disk 17 therefor. Each of the disks or chucks 17 has a hollow stud 21, in which fits the stem 22 of the can-ejector disk 23, which serves to lift the can out of the countersunk seat 18 after the double-seaming operation has been completed, so that the finished can may be delivered from the machine automatically by the stationary can-ejector or delivery-arm 100 as the table or turret 16 revolves. Ball-bearing collars 24 25 and balls 26 are preferably interposed between the rotating disk or chuck 17 and the turret or table. The collar 25 also preferably rests on springs 27. The can-holder turret or table 16 is intermittently rotated and accurately locked in position to cause each of the can-holder chucks 17 to accurately register with the upper rotating and reciprocating can-holder chuck or disk 27. The rotating chuck or disk 27 is furnished with a countersunk seat 28 to receive the ejector-disk 29 and with a shoulder 30 to fit within the countersunk head or cover 31 of the can 32, the flange 33 of which cover is to be folded into a double seam 34 with the flange 35 of the can-body, thus compressing the packing 36 and forming a strong, rigid, air-tight joint. The can ejector or stripper disk 29 is secured to the stem or stud 37, having a collar 38 and spring 39, which holds the ejector-disk normally retracted, so that the same is out of contact with the can except when the stud or stem 37 is engaged by the sliding rod 40, which operates the ejector to discharge the can. The chuck or disk 27 is secured to a hollow shaft 41, which is rotated by a bevel-gear 42, splined thereto to permit the necessary sliding movement, and which meshes with a bevel-gear 43 on the driving-shaft 44, which receives its power from the pulley 45 and belt 46. The necessary up and down movement is communicated to the upper chuck or disk 27 from the driving-shaft 47 through the gears 48 49, shaft 50, bevel-gears 51 52, cam 53, and lever 54, which is connected to the chuck-shaft 41 through collars 55 56, balls 58 being inserted between the collars 55 56. The ejector-operating rod 40 is operated as required by a lever 57 and pitman 58, connected to the disk 59 on the shaft 105.

60 is a continuously-rotating tool-carrier, the same being provided, preferably, with three sets of double-seaming rollers or tools 61 62 63, each set of double-seaming tools preferably comprising three grooved rollers or tools, each journaled on the periphery of the circular tool-carrier disk, so that as the tool-carrier disk revolves the three tools of each set will be brought successively into contact with the flanges of the can cover and body, and thus operate to fold the same into a double seam. Continuous rotary movement is communicated to the tool-carrier through a worm-gear 64 on the shaft 65 of the tool-carrier, worm 66 on the shaft 67, gears 68 69 on shaft 70, and gears 71 72, the latter being on the driving-shaft.

The can-holder turret or table 16 is intermittently rotated and accurately locked in position as required by means of a Geneva stop-gear, comprising a disk 73, having radial slots 74 and circular recesses 75 and rotating shaft 76, carrying arm 77, roller 78, and mutilated disk 79. Motion is communicated to the shaft 76 through the bevel-gears 80 81, bevel-gears 82 83, shaft 84, and gears 85 86.

The can-ejector disk 23 or its stem 22 is operated by a stationary cam 90, with which the stem 22 engages as the can-holder turret rotates. The tool-carrier is mounted upon an adjustable slide 91, which may be adjusted in position to cause the double-seaming tool to properly operate upon the can whatever its size by means of the hand adjusting-screw 92. The can-holder turret is carried upon a vertically-adjustable bracket 93, which may be adjusted up and down as required to operate on cans of different heights by means of the hand adjusting-screw 94.

After the cans have been double-seamed by the operation of the machine the cans are automatically discharged by the ejector-arm 100 into the discharge-chute 101.

The turret or table 16 is provided with brakes or plates 102, which engage brake flanges or surfaces 103 on the rotating chucks or disks 17 when the springs 27 raise said chucks or disks, thus automatically stopping the rotation and facilitating the putting of the cans in the disks. When the upper rotary-driven chuck or disk 27 is depressed, it depresses the lower disk 17 and throws it automatically out of contact with the brake, thus leaving it free to rotate with the upper chuck and the can-head between the two.

The shaft 70, through which motion is communicated from the driving-shaft 47 to the worm and worm-gear by which the tool-carrier is rotated, is provided with a flexible connection or coupling 106 to permit the necessary up-and-down adjustment of the tool-carrier by the adjusting-screw 107. The shaft 70 is splined to the gear 69 to permit the in-and-out adjustment of the tool-carrier by the adjusting-screw 92.

We claim—

1. In a double-seaming machine, the combination with an intermitently-rotating can-holder turret or table provided with a series of rotating can-holder chucks or disks, of an opposing rotating and reciprocating can-holder chuck, and a continuously-rotating tool-carrier provided with double-seaming tools or rollers, substantially as specified.

2. In a double-seaming machine, the combination with an intermittently-rotating turret or table, having a series of rotatable can-holder chucks or disks, an upper rotating and reciprocating can-holder chuck or disk, and a continuously-rotating tool-carrier provided with a series of sets of double-seaming tools or rollers, substantially as specified.

3. In a double-seaming machine, the combination with an intermittently-rotating turret or table, having a series of rotatable can-holder chucks or disks, an upper rotating and reciprocating can-holder chuck or disk, a continuously-rotating tool-carrier provided with a series of double-seaming tools or rollers, can-ejector disks in said can-holder chucks on said rotating turret or table, and a stationary cam for operating said can-ejector disks, substantially as specified.

4. In a double-seaming machine, the combination with an intermittently-rotating turret or table, having a series of rotatable can-holder chucks or disks, an upper rotating and reciprocating can-holder chuck or disk, a continuously-rotating tool-carrier provided with a series of double-seaming tools or rollers, can-ejector disks in said can-holder chucks on said rotating turret or table, a stationary cam for operating said can-ejector disks, and a can-discharging arm, substantially as specified.

5. In a double-seaming machine, the combination with an intermittently-rotating turret or table, having a series of rotatable can-holder chucks or disks, an upper rotating and reciprocating can-holder chuck or disk, a continuously-rotating tool-carrier provided with a series of double-seaming tools or rollers, can-ejector disks in said can-holder chucks on said rotating turret or table, and a stationary cam for operating said can-ejector disks, said upper can-holder chuck having a can-ejector disk and means for operating said upper can-holder chuck and ejector-disk, substantially as specified.

6. The combination with an intermittently-rotating can-holder turret or table having a series of rotatable can-holder chucks provided with can-ejector disks, a stationary cam for operating said can-ejector disks, an upper rotating and reciprocating can-holder chuck, and a tool-carrier furnished with double-seaming tools or rollers, substantially as specified.

7. The combination with a set of double-seaming tools or rollers, of an upper rotating and reciprocating can-holder chuck and an opposing lower, rotatable can-holding chuck provided with a countersunk rubber or elastic pad to receive the can, substantially as specified.

8. In a double-seaming machine, the combination with a set of double-seaming tools or rollers, of an upper rotating and reciprocating can-holder chuck, and an intermittently-rotating can-holder turret or table, provided with a series of can-holder chucks, and means for intermittently rotating and locking said turret or table in position, substantially as specified.

9. In a double-seaming machine, the combination with a set of double-seaming tools or rollers, of an upper rotating and reciprocating can-holder chuck, and an intermittently-rotating can-holder turret or table, provided with a series of can-holder chucks and means for intermittently rotating and locking said turret or table in position, comprising a Geneva stop movement or gear, substantially as specified.

10. The combination with a rotary table provided with can-holder chucks or disks having brake flanges or surfaces, brakes secured to said turret or table, an upper rotating and reciprocating chuck or disk, and springs holding said lower chuck or disk normally in contact with said brakes, substantially as specified.

11. In a double-seaming machine the combination with seaming-tools, of an upper rotating and reciprocating can-holder chuck, a lower rotating can-holder chuck having a brake flange or surface, a brake engaging the same, the depression of the upper chuck to clamp the can relieving the brake from the lower chuck, substantially as specified.

12. In a double-seaming machine the combination with seaming-tools, of an upper rotating and reciprocating can-holder chuck, a lower rotating can-holder chuck having a brake flange or surface, a brake engaging the same, the depression of the upper chuck to clamp the can relieving the brake from the lower chuck, and a spring normally locking the lower chuck in engagement with said brake, substantially as specified.

13. In a double-seaming machine, the combination with an intermittently-rotating can-holder turret or table provided with a series of rotating can-holder chucks or disks, of an opposing rotating and reciprocating can-holder chuck, a continuously-rotating tool-carrier provided with double-seaming tools or rollers, a horizontally-adjustable slide upon which the tool-carrier is mounted, means for adjusting the tool-carrier vertically, a worm and gear for rotating the tool-carrier, and a shaft having a flexible connection or coupling for communicating motion thereto and permitting the necessary vertical adjustment, substantially as specified.

14. The combination with an intermittently-rotating turret or table, provided with a series of rotating can-holder chucks or disks, of a rotating tool-carrier supported independently of said chuck provided with a set of double-seaming tools, substantially as specified.

15. The combination with a movable carrier having a series of rotating can-holder chucks, of a movable tool-carrier having a series of sets of double-seaming tools thereon, substantially as specified.

16. The combination with a movable carrier having a series of can-holder chucks, of a rotating tool-carrier provided with a series of sets of double-seaming tools or rollers, substantially as specified.

Dated June 26, 1901.

EDWIN NORTON.
JOHN G. HODGSON.

Witnesses to signature of Edwin Norton:
  HENRY F. AKIN,
  F. S. WHEELER.
Witnesses to signature of John G. Hodgson:
  H. M. MUNDAY,
  EDMUND ADCOCK.